United States Patent  
Adl-Tabatabai et al.

(10) Patent No.: US 6,928,582 B2
(45) Date of Patent: Aug. 9, 2005

(54) METHOD FOR FAST EXCEPTION HANDLING

(75) Inventors: Ali-Reza Adl-Tabatabai, Santa Clara, CA (US); Guei-Yuan Lueh, San Jose, CA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 588 days.

(21) Appl. No.: 10/039,121

(22) Filed: Jan. 4, 2002

(65) Prior Publication Data

US 2004/0078560 A1 Apr. 22, 2004

(51) Int. Cl.[7] .............................................. G06F 11/00
(52) U.S. Cl. ................................... 714/9; 712/244
(58) Field of Search ................ 714/9, 34, 35, 714/39, 47, 38, 51; 712/244, 245, 231, 236, 225, 226, 227, 229

(56) References Cited

U.S. PATENT DOCUMENTS

| | | | | |
|---|---|---|---|---|
| 5,305,455 A | * | 4/1994 | Anschuetz et al. | 718/100 |
| 5,485,629 A | * | 1/1996 | Dulong | 712/24 |
| 5,729,728 A | * | 3/1998 | Colwell et al. | 712/234 |
| 5,774,711 A | * | 6/1998 | Henry et al. | 712/244 |
| 5,778,211 A | * | 7/1998 | Hohensee et al. | 703/26 |
| 5,784,607 A | * | 7/1998 | Henry et al. | 712/245 |
| 5,905,744 A | * | 5/1999 | Reise et al. | 714/821 |
| 6,453,412 B1 | * | 9/2002 | Henry et al. | 712/244 |
| 6,496,926 B1 | * | 12/2002 | Corrie et al. | 712/245 |
| 6,691,210 B2 | * | 2/2004 | Faraboschi et al. | 711/135 |
| 2002/0092002 A1 | * | 7/2002 | Babaian et al. | 717/137 |
| 2004/0078560 A1 | * | 4/2004 | Adl-Tabatabai et al. | 712/244 |

* cited by examiner

Primary Examiner—Nadeem Iqbal
(74) Attorney, Agent, or Firm—Blakely, Sokoloff, Taylor & Zafman LLP

(57) ABSTRACT

A system and method for exception handling includes executing a first instruction. The first instruction then returns an exception. A program counter is used to determine the location of a second instruction. The second instruction includes a pointer to at least one exception handler.

26 Claims, 9 Drawing Sheets

METHOD FOR FAST EXCEPTION HANDLING

FIELD OF THE INVENTION

The disclosed invention relates to processing instructions in a processor and more specifically to processing exceptions that are returned when an instruction is executed.

BACKGROUND OF THE INVENTION

Computer programs often have language level exceptions. A language level exception is a result of an executed statement that is outside an allowed range of results to that statement. An example Java language method "foo" is shown below:

Method int foo( ) { int A[ ]=new int[2];

A [3]=3;

}

In the above example method foo returns an integer value of A from an array. The array includes two elements. Next, a third element from the array is requested. Since the array has only 2 elements, then there is not third element and an exception is returned or thrown. If foo were called by another "caller" method, then the exception would be returned to the caller method because foo, as shown above, does not include any exception handlers.

The above method foo is an example of an implicit exception because the exception is a result of a statement execution that results in an out of range result. Exceptions can also be explicit. An explicit exception is a specific statement to throw an exception as is well known in the art. Below is an example of a Java instruction that throws an explicit exception:

throw new applicationexception( )

A method is often called by a caller method. An example of a caller method "bar" is shown below:

| PC# | Caller method |
|---|---|
|  | int bar( ) { |
| S1 | try { |
| S2 | ... |
| S3 | foo( ) |
| S4 | ... |
| S5 | } catch (exception x) { |
| S6 | ... |
|  | } |
|  | } |

The PC# is a program counter number. For example at program counter S1, the caller method bar tries several statements in order (some not shown) at program counter S2 through program counter S4. The bar method also includes a list of exception handlers such as at program counter S5. The exception handlers at S6 are used to handle or process the exceptions that result from the S2–S4 statements, such as foo, that are executed by the caller method. If the type of an exception thrown in S2–S4 does not match the exception handlers in S5, then if bar has been called by another method, then bar can throw an exception to the method that called bar (i.e. bar's caller method).

FIG. 1 illustrates a prior art process of processing an exception. First, in block 102, a current method executes a statement S in a current try block. In block 104 the statement S returns or throws an exception. In block 106, the data structure of the entire code is searched to find the location of exception handlers in the current try block. In block 108, the runtime switches to a generic code section for analyzing the data structure of the current try block to determine if the current try block includes any exception handlers. If in block 108, the current try block does include exception handlers, then in block 110 the exception handlers are used to process the exception. In block 140, the runtime uses more generic code to analyze the exception handlers to determine if a correct exception handler is available in the current try block. If a correct exception handler is available in block 140, then in block 150, the correct exception handler in selected. The exception is processed in the correct exception handler in block 152.

Returning to block 140, if a correct exception handler is not available, then the process continues in block 120 as described below.

Often try blocks are nested i.e. a first try block is fully contained within a second try block and the second try block could also be fully contained within yet a third try block and so forth. When the try blocks are nested, as described above, the second try block is described as having a higher level then the first try block. The third try block has a higher level than both the first and the second try blocks.

Returning to block 108, if the current try block does not include any exception handlers, then the process continues at block 120. In block 120 if there is a next higher level try block, then in block 122, the next higher level try block is designated as the current try block and the process repeats beginning at block 106.

If in block 120, there is not a next higher level try block, then in block 124 the data structure of the entire code is examined to find the exception handlers in the current method. In block 126 the process shifts to the exception handlers in the current method to process the exception. In block 128, the exception handlers in the current method are examined to determine if a correct exception handler is available in the current method. If a correct exception handler is available in block 128, then the process continues in block 150 as described above.

If a correct exception handler is not available in the current method in block 128, then the process continues in block 130. Often one method (a caller method) will call another method (a callee method) and therefore the exception handlers the caller method may be used to process the exception from the callee method. In block 130, the code is examined to determine if there is a subsequent method that called the current method. If there is a subsequent method that called the current method, then the subsequent method is designated as the current method in block 132 and the process repeats at block 124 above. If there is not a subsequent method that called the current method, then the execution stops in block 134 and an error results because the exception cannot be processed.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
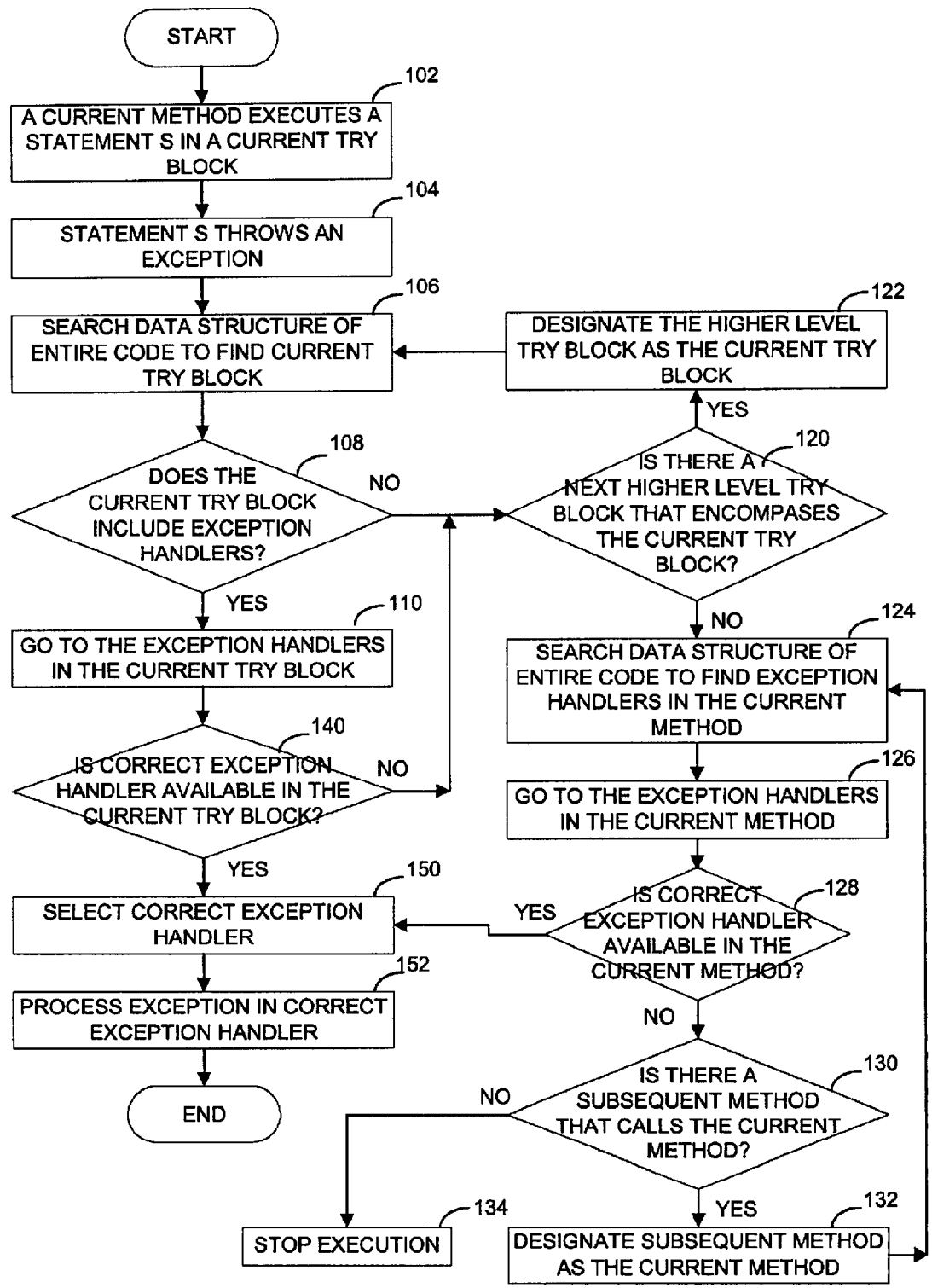
FIG. 1 illustrates a more detailed description of the process of processing an exception

As will be described in more detail below, one embodiment of the present invention provides a fast exception handling process. In one embodiment the program counter is used to determine a location of a second instruction. The second instruction includes information that identifies the location of the exception handlers in the caller method. the described methods are in sharp contrast to using a data structure of the caller method to determine the location of exception handlers.

There are various types of instruction set architectures (ISA) that are designed for each type or family of microprocessors. For example, an IA-64 instruction set architecture is for a 64-bit microprocessor built by Intel Corporation. The IA-64 instruction set provides for extensive parallel processing and includes a 128-bit instruction bundle. The 128-bit instruction bundle allows multiple instructions to be fetched in each machine cycle. The instructions are then processed in some level of parallelism.

One feature that is not unique to the IA-64 instruction set architecture is referred to as a no-op instruction. A no-op instruction is an instruction that when executed has no side. A no-op instruction also includes unused bits. No-op instructions are typically used as space fillers to fill in an instruction bundle because of timing or processing issues or for various other reasons why a no-op instruction could be inserted into an instruction bundle. A no-op instruction typically uses only a few of the bit space allotted. For example, a typical no-op instruction in the IA-64 ISA has 32 bits allotted but only uses 4 bits to identify it as a no-op instruction. Therefore, 28 bits are left unused in the no-op instruction.

There are many other types of instruction that architectures that have similar "no-op type" instructions. For example, the MIPS instruction set architecture which was developed by Silicon Graphics of Mountain View, Calif. include a instruction that is similar to a no-op instruction that uses the zero'th register. An instruction to add to the zero'th (r0) register in MIPS does not create a change or operation in the processor and also includes unused bit space and can, for the purposes as discussed herein, therefore be considered analogous to a no-op instruction in the IA-64 instruction set.

Other instruction set architectures that also include similar no-op type instructions include the SPARC (scalable processor architecture) developed by Sun Microsystems, Inc. of Palo Alto, Calif. Yet another example is a PA-RISC, which is another instruction set architecture developed by Hewlett Packard in Palo Alto, Calif. There are many other ISAs that include other similar no-op type instructions (referred to herein as a no-op instruction). The above example ISAs are not exhaustive but are rather only illustrative. The inventions disclosed herein can be utilized in any ISA that includes a no-op type of instruction or any other type of instruction that would allow referral type information to be included within the instruction as described herein.

As described above, language level exceptions can exist in many languages, the examples used herein are described using Java computer programming language, but other programming languages also include language level exceptions and the concepts described herein could also be used in other such languages. Other such languages include C# and C++ and many other object-oriented-type-programming languages.

Figure 2:
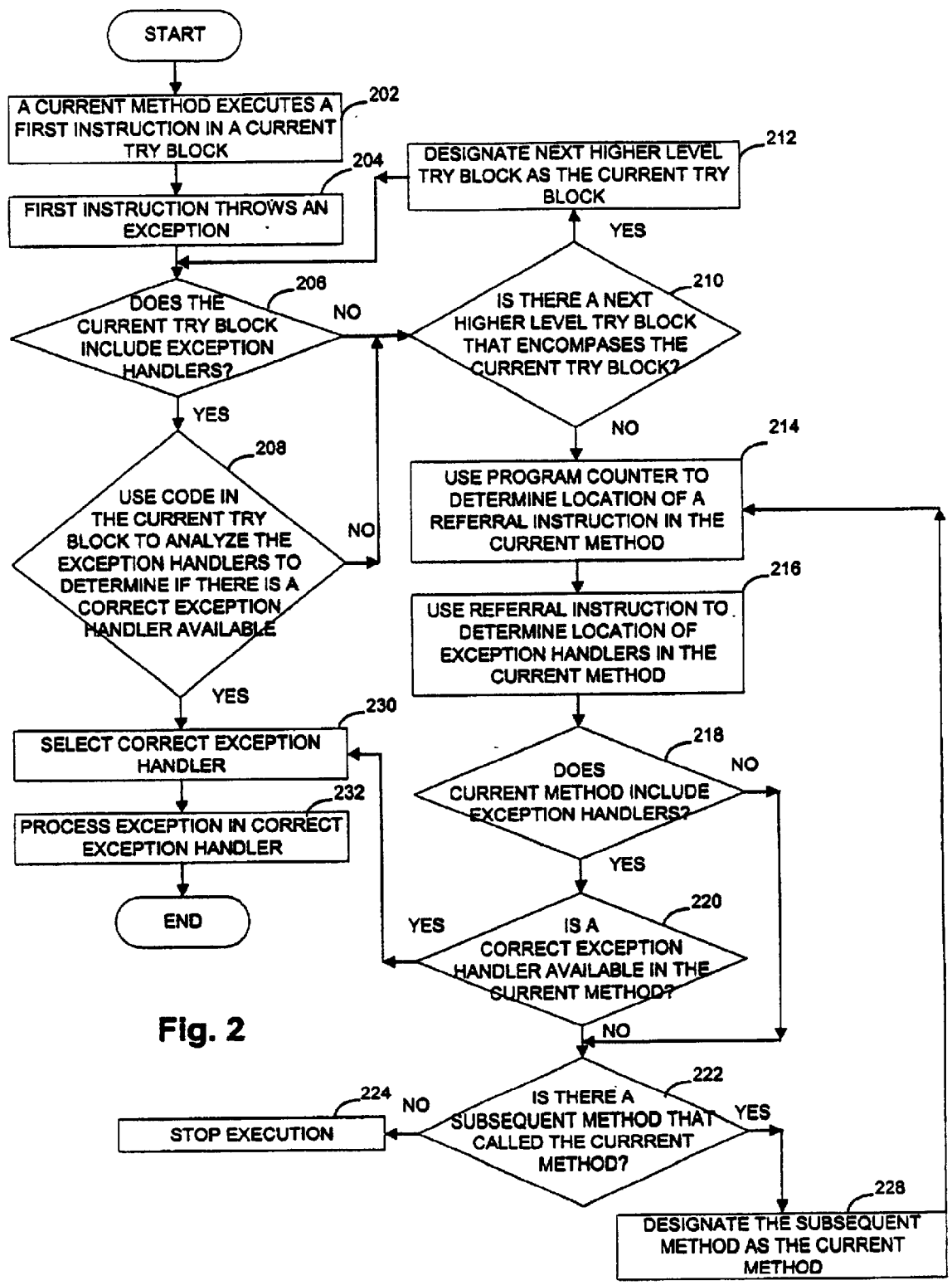
FIG. 2 illustrates one embodiment of one process of handling an exception.

FIG. 2 illustrates one embodiment of a process for fast handling of an exception. First, in block 202, a current method executes a first instruction in a current try block. In block 204, the first instruction throws an exception. In block 206, the current try block is examined to determine if the current try block includes exception handlers. If in block 206, the current try block includes exception handlers, then in block 208, the code in the current try block is used to compare the exception handlers types to the thrown exception to determine if a correct exception handler is available. If a correct exception handler is available, then in block 230, the correct exception handler is selected and the exception is processed in the selected exception handler in block 232.

Returning to block 206, if the current try block does not include exception handlers, then the process continues in block 210. In block 210 the current try block is examined to determine if a subsequent try block encompasses the current try block. If the current try block is encompassed by the subsequent try block, then in block 212, the subsequent try block is designated as the current try block and the process repeats at block 206.

If in block 210, the current try block is not encompassed by the subsequent try block, then in block 214, the program counter is used to determine the location of a second, referral instruction in the current method. Then in block 216, the referral instruction is used to determine the location of exception handlers in the current method.

In one embodiment, referral instruction is a no-op instruction and the referral instruction is a predetermined offset or a standard offset from the first instruction. For example, the referral instruction is immediately proceeding or immediately following the first instruction in the compiled code. Alternatively, the referral instruction could be offset multiple instructions from the first instruction. In one embodiment, the offset between the first instruction and the referral instruction is a standard offset for all instructions that return exceptions. For example the referral instruction may always be two instructions preceding the first instruction.

Returning to FIG. 2 and continuing in block 218, the current method is examined to determine if the current method includes exception handlers. If the current method does not include exception handlers, then the process jumps to block 222 described below. If, in block 218, the current method includes exception handlers, then in block 220 the exception handlers in the current method are examined to determine if there is a correct exception handler available in the current method. If there is a correct exception handler available in the current method, then the process continues in block 230 as described above. If there is not a correct exception handler available in the current method, then the process continues in block 222. In block 222, the current method is examined to determine if there is a method that called the current method. If there is not a method that calls the current method, then execution stops and a program error is returned in block 224. If in block 222, there is a method that calls the current method, then the method that calls the current method is designated as the current method in block 228. The process then repeats starting at block 214 as described above.

In one embodiment, the compiler automatically inserts the exception handler analysis code in the try block, such as described in block 208 above, when the code is compiled. In another embodiment the compiler automatically inserts the referral instruction when the code in compiled. The compiler can also automatically insert code into the compiled code that uses the program counter to identify the referral instruction, such as described in blocks 214, 216 above, when the code is compiled. For example, the compiler can automatically insert, during the compiling process, into every try block a section of code that processes any exceptions that may be generated by that try block.

Figure 3A:
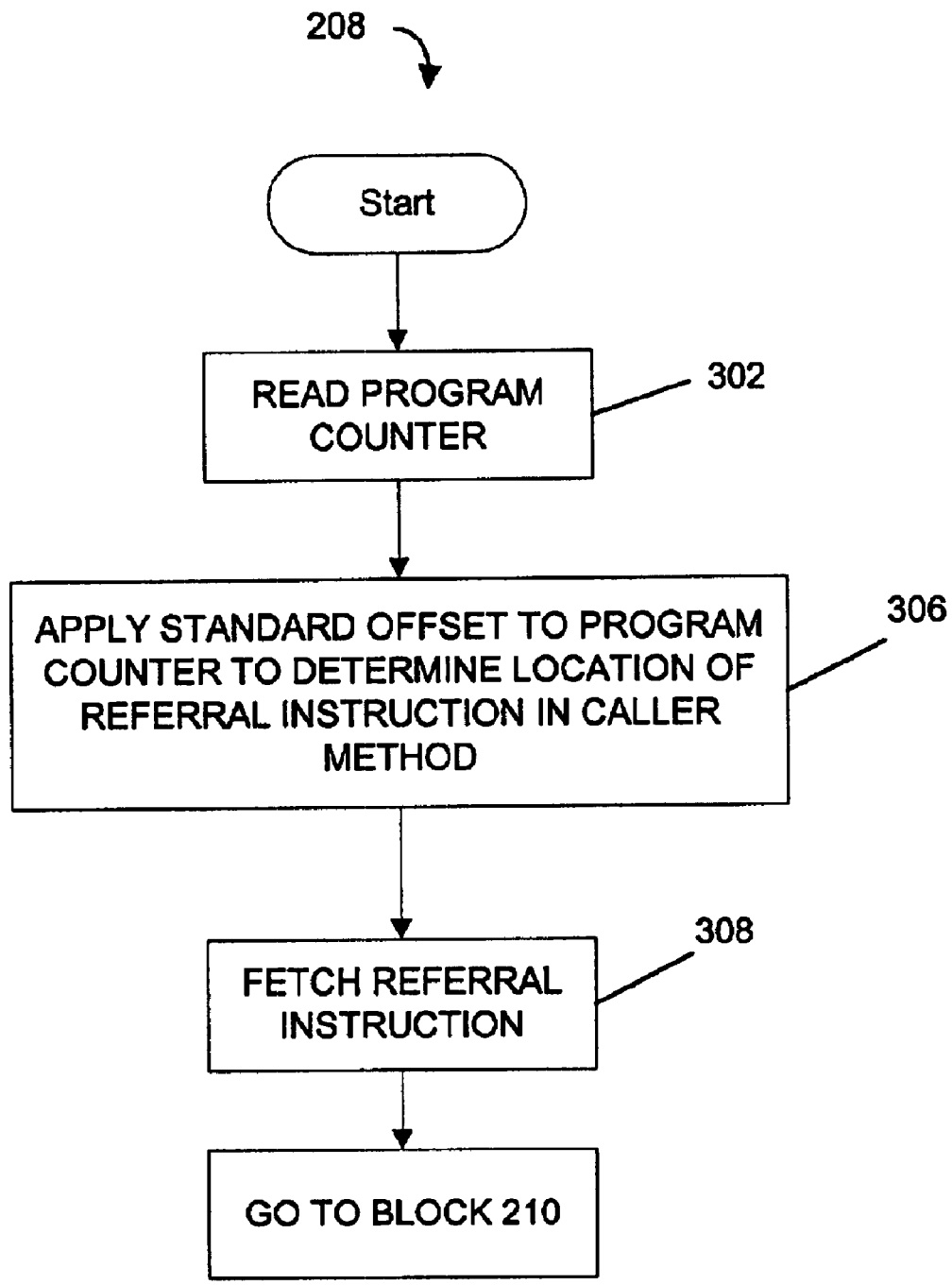
FIG. 3A shows one embodiment of using the program counter to determine the location of the referral instruction such as in block 208 of FIG. 2.

FIG. 3A shows one embodiment of using the program counter to determine the location of the referral instruction such as in block 208 of FIG. 2. In block 302, the program counter is read. Next, a standard offset is applied to the program counter in block 306. The offset applied to the program counter identifies the position of the referral instruction in the program list. In block 308, the referral instruction is fetched. The process continues at block 210 in FIG. 2.

Figure 3B:
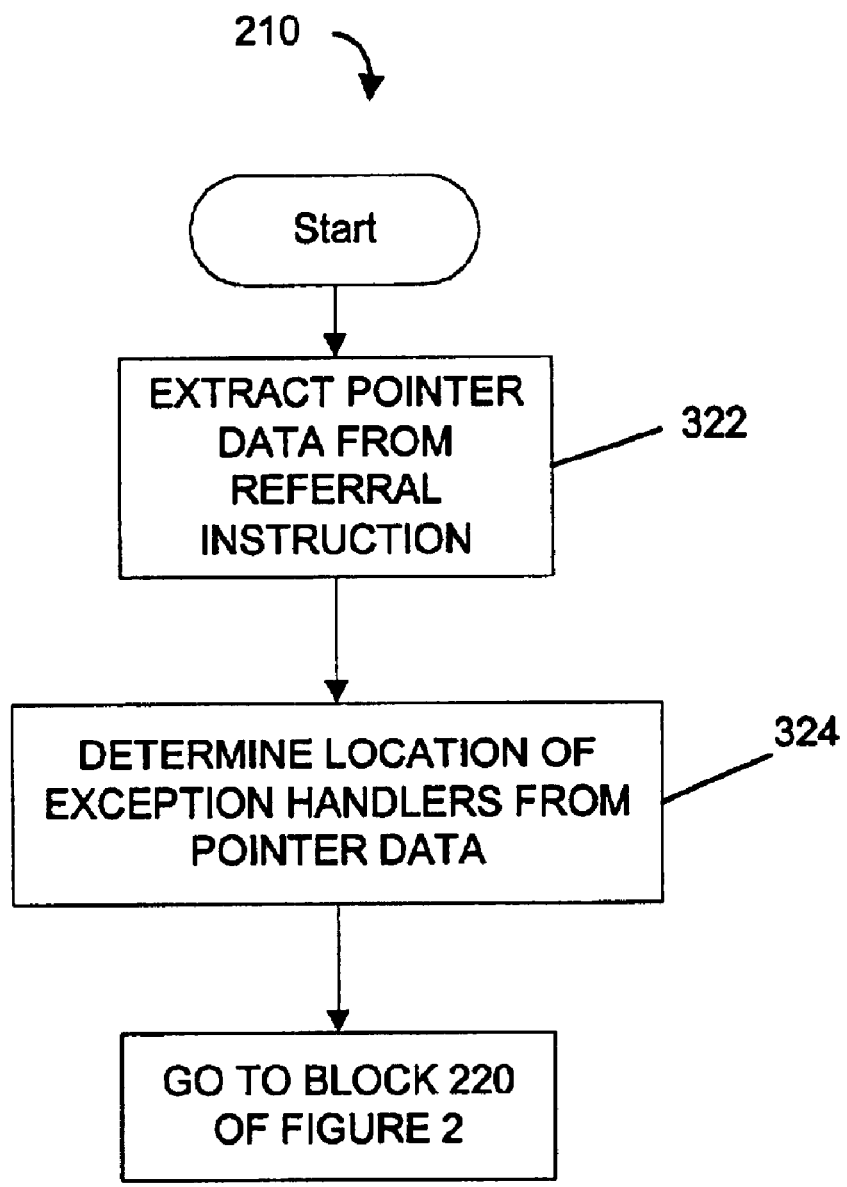
FIG. 3B illustrates one embodiment of using a referral instruction to determine the location of the exception handlers in the caller method.

FIG. 3B illustrates one embodiment of using a referral instruction to determine the location of the exception handlers in the caller method. In block 322, the pointer data is extracted from the referral instruction. The location of the exception handlers is then determined from the pointer data in block 324.

In one embodiment of block 210, the referral instruction used to determine the location of the exception handler in the caller method includes a no-op instruction. In one embodiment the "unused bits" of the no-op instruction include an address or an offset or some specific pointer that points to the location of the exception handlers in the caller method.

For example, if the first instruction is at program counter line 10 when the first instruction is fetched for execution, typically the program counter increments to the instruction at line 11 so that when instruction number 10 is completed, the program automatically returns to the instruction in line 11. A referral, no-op instruction can be placed at program counter line 9, immediately proceeding the first instruction. In this example, placing the referral instruction immediately proceeding the exception-resulting first instruction is a standard offset used throughout the program such that each exception-resulting instruction has a corresponding referral instruction immediately proceeding. The run time includes the logic that if an exception is returned by an instruction, then the program counter is used to determine the location of the referral instruction. In this example, two instruction lines are deducted from the value of the program counter (11) to determine the location of the referral instruction at line 9. The no-op instruction is then fetched and executed in the program stack.

In one embodiment, the run time also includes logic to extract the pointer data that points to the exception handlers in the current caller method from the referral, no-op instruction. For example, if the no-op instruction includes 32 bits and yet only uses bits 0–3 to identify the no-op instruction as a no-op instruction, then the any set of the remaining 28 bits could be used to store the pointer data. The pointer data can include an offset i.e. a number of instructions to shift to the beginning of the exception handlers. The pointer data can also include a starting address of the exception handlers. Alternatively, the pointer can include a range of addresses that include the exception handlers.

In one embodiment, the pointer is located in a standard location in the unused bits of the no-op instruction. For example, in all referral, no-op instructions in the program, the pointer data is located in bits 24–31. Alternatively, the pointer data could be located in bits that are adjacent to the bits used to identify the no-op instruction as a no-op instruction. In this example, the pointer data could be located in bits 4–11 of the no-op instruction.

In another embodiment, determining location of the exception handler from the pointer data can include pointing to a portion of the data structure that includes the try or method that the run time should use to determine the location of the exception handlers. Alternatively, determining location of the exception handler from the pointer data can include a specific location of the exception handlers in the try or method.

Figure 3C:
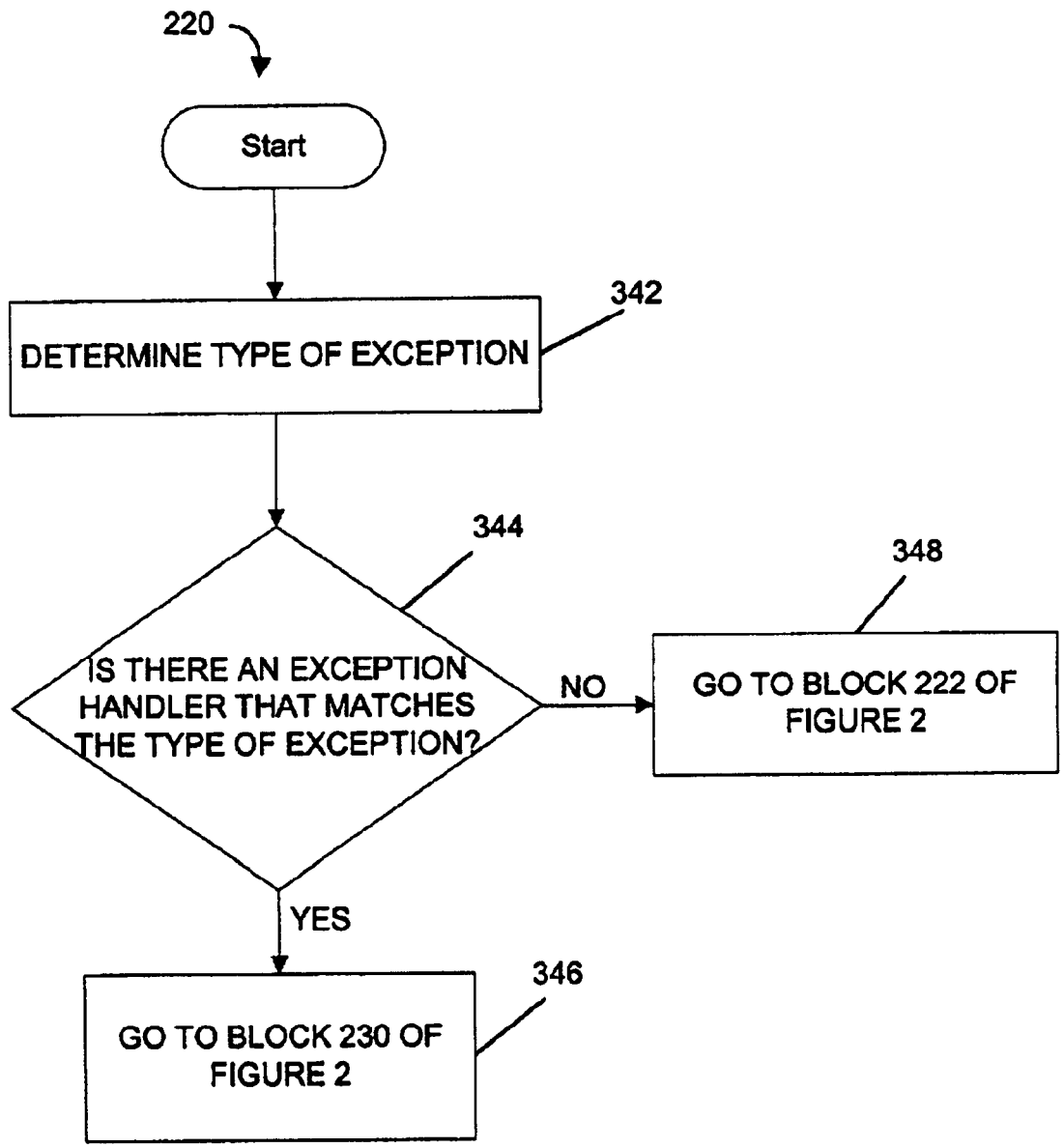
FIG. 3C illustrates one embodiment of determining if the correct exception handler is available in block 220 of FIG. 2.

FIG. 3C illustrates one embodiment of determining if the correct exception handler is available in block 220 of FIG. 2. In block 342, the type of exception that was returned in block 206 is determined. There are multiple types of exceptions that should be determined by the program author and corresponding types of exception handlers included in the program. In block 344, the type of exception is compared to the various types of exception handlers that are included in the set of exception handlers in the caller method to determine an exception handler that matches the type of exception. If a matching type of exception handler is found in the set of exception handlers in the caller method, then the process returns to block 230 of FIG. 2. If a matching type of exception handler is not found, then the process returns to block 222 of FIG. 2.

The data structure described above in FIG. 1 is typically very precise and very detailed because it describes the entire structure of the program and the location of all the instructions in the program. In the prior art method, when an exception is encountered, code processing is stopped, control of the run time engine is transferred to the tasks of fetching the data structure and then examining the data structure to determine the location of the exception handlers as described in FIG. 1 above. Stopping code execution to fetch and search the data structure delays and otherwise slows the processing of the compiled code in the processor. Further switching control of the run time from the program stack to the data structure to the exception handlers and finally back to the program stack is very inefficient as compared with the processes described in FIGS. 2–3C above.

Figure 4:
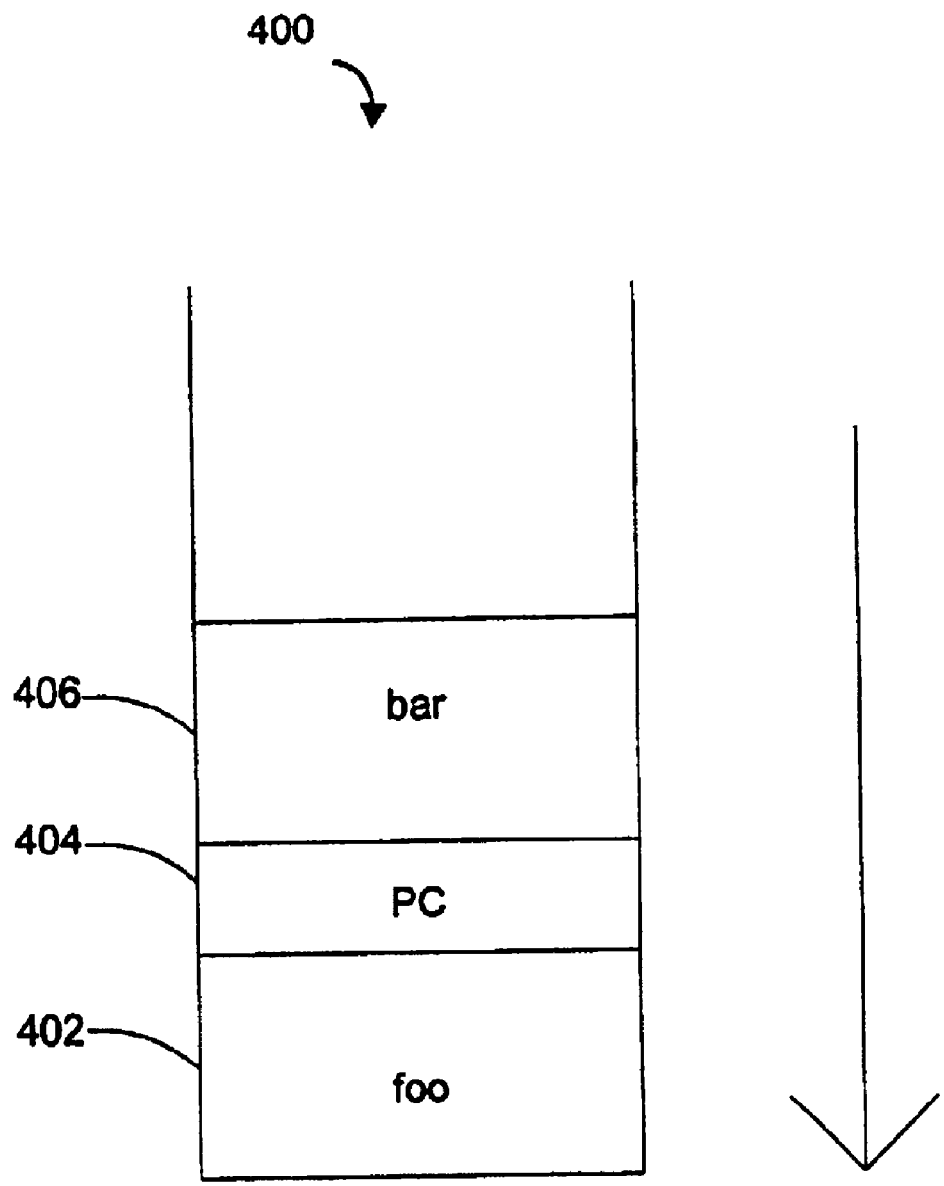
FIG. 4 illustrates one embodiment of a program stack.

FIG. 4 illustrates one embodiment of a program stack. As shown, an method "foo" 402 is currently being executed in the program stack. The program stack also includes a program counter (PC) 404 that directs execution to the correct return location in the program listing so the run time knows which instruction to return to once instruction foo 402 is executed. "Bar" is a caller method that follows the instruction foo 402. For example, the method foo 402 returns an exception. In one embodiment, the program counter is used to determine the location of a referral instruction such as a no-op instruction. As described above, the referral instruction includes a pointer to the exception handlers. The exception handlers are then accessed directly by the run time.

Figure 5:
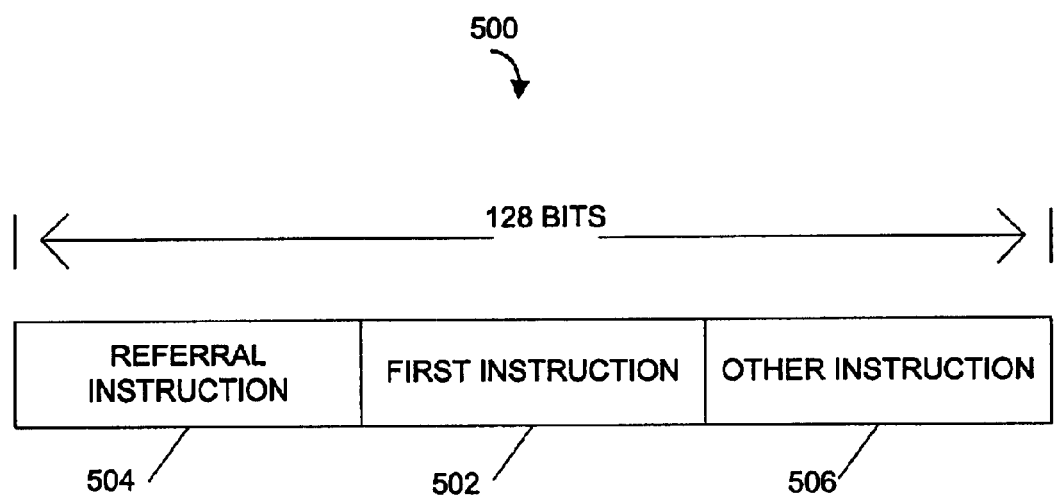
FIG. 5 shows one embodiment of an IA-64 instruction bundle.

FIG. 5 shows one embodiment of an IA-64 instruction bundle. As described before, the IA-64 instruction set is an extensively parallel processing system that fetches multiple instructions. The multiple instruction fetch is referred to as an instruction bundle. Often, the instruction bundle will include a no-op instruction. No-op instruction are included for timing or for consuming space in the instruction bundle or for various reasons that are beyond the scope of this application and that are well known in the art.

As shown in FIG. 5, the instruction bundle includes 128 bits. Each instruction can have various lengths according to the ISA. An instruction 502, and a second instruction 506, are instructions to be executed. The instruction 504 is a referral, no-op instruction that can be used for other purposes, but has no direct impact on the process, unless an exception is returned by, for example instruction 502. The no-op or referral instruction 504 can be in any one of the positions in the instruction bundle or could be in another instruction bundle that is a predetermined number of instructions offset from the instruction in this case the called instruction 502 that could return an exception.

Figure 6:
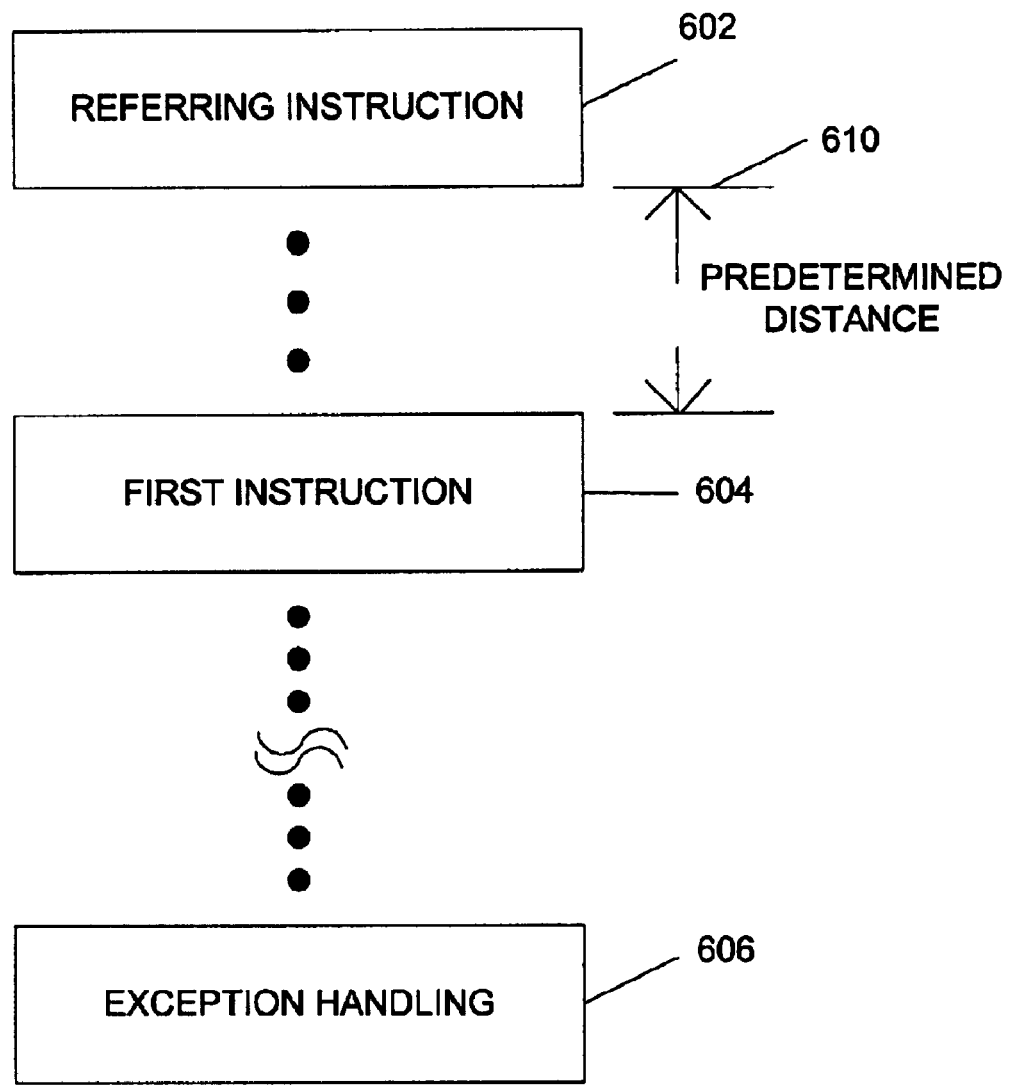
FIG. 6 illustrates in embodiment of a data structure that shows the referring instructions 602.

FIG. 6 illustrates one embodiment of a data structure that shows the referring instructions 602. A predetermined distance from the first instruction 604 and then at some other address, the exception handlers 606 start. In one embodiment the referring instruction 602 is always the same predetermined distance from the exception producing first instruction. The exception handlers 606 can be in any location as long as the referring instruction includes a pointer to the location of the exception handlers. The exception handlers 606 can be proceeding the first instruction, following the first instruction or anywhere as long as the referring instruction correctly identifies the location of exception handlers in the current caller method.

Figure 7:
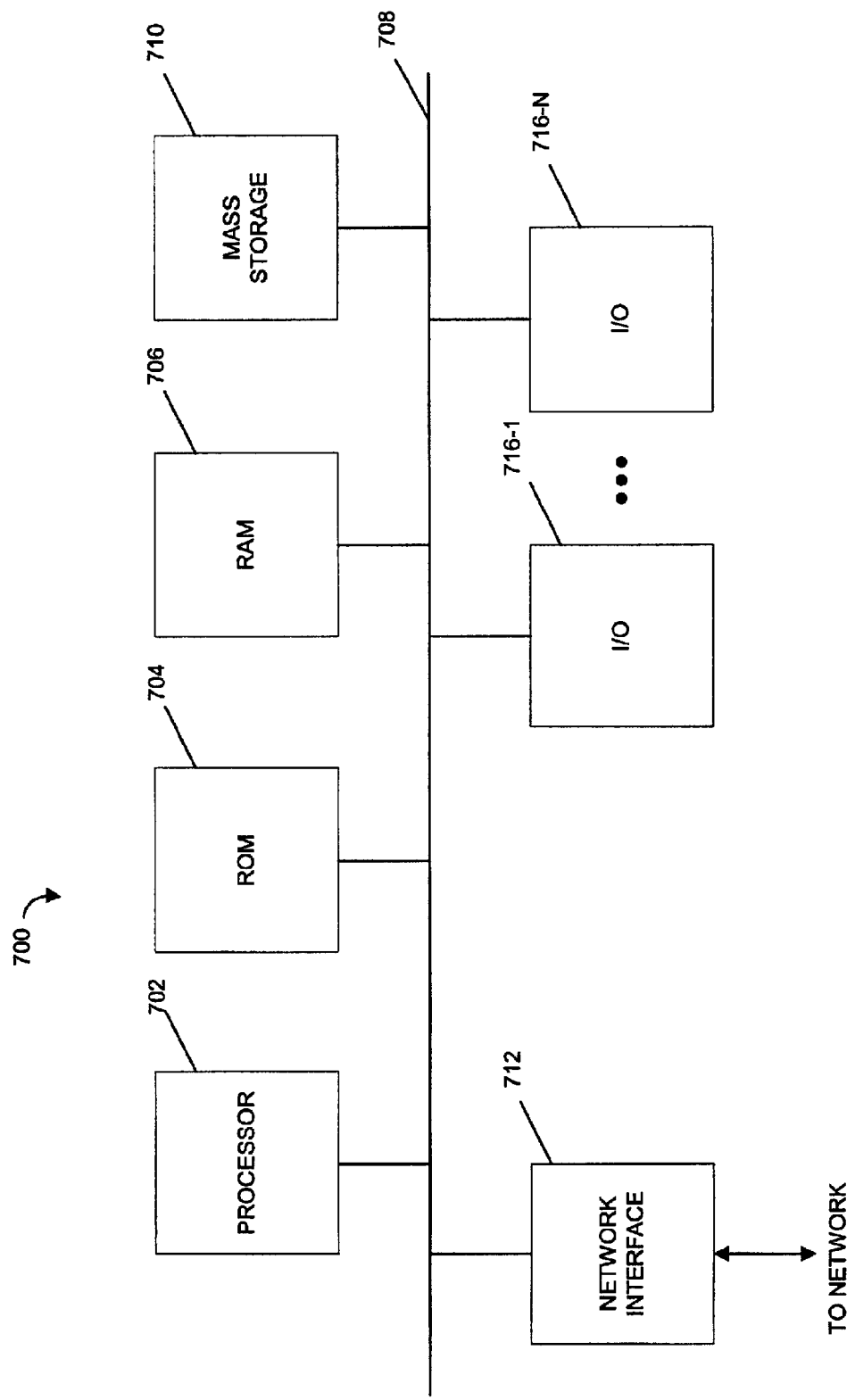
FIG. 7 illustrates one embodiment of a high-level block diagram of a computer system.

FIG. 7 illustrates one embodiment of a high-level block diagram of a computer system that could be used to execute the processes described in FIGS. 2–3 above. As shown, the computer system 700 includes a processor 702, ROM 704, and RAM 706, each connected to a bus system 708. The bus system 708 may include one or more buses connected to each other through various bridges, controllers and/or adapters, such as are well known in the art. For example, the bus system 708 may include a "system bus" that is connected through an adapter to one or more expansion buses, such as a Peripheral Component Interconnect (PCI) bus. Also coupled to the bus system 708 are a mass storage device 710, a network interface 712, and a number (N) of input/output (I/O) devices 716-1 through 716-N.

I/O devices 716-1 through 716-N may include, for example, a keyboard, a pointing device, a display device and/or other conventional I/O devices. Mass storage device 710 may include any suitable device for storing large volumes of data, such as a magnetic disk or tape, magneto-optical (MO) storage device, or any of various types of Digital Versatile Disk (DVD) or Compact Disk (CD) based storage.

Network interface 712 provides data communication between the computer system and other computer systems such as the Internet. Hence, network interface 712 may be any device suitable for or enabling the computer system 700 to communicate data with a remote processing system over a data communication link. The network interface 712 can include a conventional telephone modem, an Integrated Services Digital Network (ISDN) adapter, a Digital Subscriber Line (DSL) adapter, a cable modem, a satellite transceiver, an Ethernet adapter, a cellular telephone receiver transmitter or the like.

Of course, many variations upon the architecture shown in FIG. 7 can be made to suit the particular needs of a given system. Thus, certain components may be added to those shown in FIG. 7 for a given system, or certain components shown in FIG. 7 may be omitted from the given system.

It will be further appreciated that the instructions represented by the blocks in FIGS. 2–3C are not required to be performed in the order illustrated, and that all the processing represented by the blocks may not be necessary to practice the invention. Further, the processes described in FIGS. 2–3C can also be implemented in software stored in any one of or combinations of the ROM 704, the RAM 706 and/or the mass storage device 710.

One skilled in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An instruction bundle comprising:
   a first instruction; and
   a second instruction, wherein the second instruction includes a pointer to an exception handler and wherein the second instruction includes a predetermined offset from the first instruction, wherein the exception handler includes a plurality of exception-type handlers.

2. The instruction bundle of claim 1, wherein the predetermined offset includes a predetermined number of instructions between the first instruction and the second instruction.

3. The instruction bundle of claim 1, wherein the second instruction includes a plurality of non-executable bits.

4. The instruction bundle of claim 1, wherein the second instruction is a no op instruction.

5. The instruction bundle of claim 1, wherein the second instruction precedes the first instruction.

6. The instruction bundle of claim 1, wherein the first instruction precedes the second instruction.

7. The instruction bundle of claim 1, wherein the instruction bundle is an IA64 instruction bundle.

8. The instruction bundle of claim 1, wherein the instruction bundle is included in an instruction set that includes at least one instruction in the instruction bundle with an unused bit space.

9. An instruction bundle comprising:
   a first instruction; and
   a no op instruction, wherein the no op instruction includes a pointer to an exception handler and wherein the no op instruction is offset a predetermined number of instructions from the first instruction, wherein the exception handler includes a plurality of exception-type handlers.

10. The instruction bundle of claim 9, wherein the instruction bundle is an IA64 instruction bundle.

11. A method for handling an exception comprising:
   executing a first instruction wherein the first instruction returns an exception;
   using a program counter to determine the location of a second instruction, wherein the second instruction includes a pointer to an exception handler, the exception handler includes a plurality of types of exception handlers;

determining a type of the exception; and determining if one of the plurality of types of exception handlers matches the type of the exception.

12. The method of claim 11, wherein the pointer includes a number of instructions between a subsequent instruction and the exception handler, wherein the subsequent instruction follows the first instruction.

13. The method of claim 11, wherein the pointer includes an encoded address of the exception handler.

14. The method of claim 11, wherein the pointer includes a number of instructions between the first instruction and the exception handler.

15. The method of claim 11, wherein the pointer includes a number of instructions between the second instruction and the exception handler.

16. The method of claim 11, wherein the second instruction is offset a predetermined number of instructions from the first instruction.

17. The method of claim 11, wherein the program counter points to a subsequent instruction that a program execution stack will return to after the first instruction is executed.

18. The method of claim 11, wherein the first instruction and the second instruction are included in an instruction bundle.

19. The method of claim 11, wherein using a program counter to determine the location of the second instruction includes identifying the second instruction as an instruction that is a predetermined number of instructions from a return instruction that is pointed to by the program counter.

20. A compiled code segment comprising:

a first instruction; and a no op instruction, wherein the no op instruction is a fixed number of instructions from the first instruction and wherein the no op instruction includes a pointer to an exception handler, wherein the exception handler includes a plurality of exception-type handlers.

21. A compiled code segment comprising:

a first return sequence that returns normally; and a return sequence that includes a program counter, wherein the program counter indirectly points to an exception handler, wherein the program counter points to a second instruction and wherein the second instruction includes a pointer to the exception handler, wherein the exception handler includes a plurality of exception-type handlers.

22. A system for processing an exception comprising:

a processor;

a storage facility coupled to the processor and containing instructions executable by the processor which configure the system to:

execute a first instruction wherein the first instruction returns an exception;

use a program counter to determine the location of a second instruction, wherein the second instruction includes a pointer to an exception handler, the exception handler includes a plurality of types of exception handlers;

determine a type of the exception; and determine if one of the plurality of types of exception handlers matches the type of the exception.

23. A system of claim 22, wherein the pointer includes an encoded address of the exception handler.

24. A method for handling an exception comprising:

executing a first instruction wherein the first instruction returns an exception;

using a program counter to determine the location of a second instruction that includes a pointer to an exception handler, and identifying the second instruction as an instruction that is a predetermined number of instructions from a return instruction that is pointed to by the program counter.

25. A machine-readable medium having stored thereon a set of instructions, which when executed, perform a method comprising:

executing a first instruction wherein the first instruction returns an exception;

using a program counter to determine the location of a second instruction that includes a pointer to an exception handler, and identifying the second instruction as an instruction that is a predetermined number of instructions from a return instruction that is pointed to by the program counter.

26. A machine-readable medium having stored thereon a set of instructions, which when executed, perform a method comprising:

executing a first instruction wherein the first instruction returns an exception;

using a program counter to determine the location of a second instruction, wherein the second instruction includes a pointer to an exception handler, the exception handler includes a plurality of types of exception handlers;

determining a type of the exception; and determining if one of the plurality of types of exception handlers matches the type of the exception.

* * * * *